United States Patent
Arellano

(10) Patent No.: US 7,233,712 B2
(45) Date of Patent: Jun. 19, 2007

(54) TEMPERATURE-CONTROLLED FLEXIBLE OPTICAL CIRCUIT FOR USE IN AN ERBIUM-DOPED FIBER AMPLIFIER AND METHOD FOR FABRICATING THE FLEXIBLE OPTICAL CIRCUIT

(75) Inventor: Aaron G. Arellano, Allen, TX (US)

(73) Assignee: Sanmina-SCI Corporation, Huntsville, AL (US)

( * ) Notice: Subject to any disclaimer, the term of this patent is extended or adjusted under 35 U.S.C. 154(b) by 0 days.

(21) Appl. No.: 10/730,460

(22) Filed: Dec. 8, 2003

(65) Prior Publication Data

US 2005/0018950 A1    Jan. 27, 2005

Related U.S. Application Data

(63) Continuation-in-part of application No. 10/127,089, filed on Apr. 22, 2002, now Pat. No. 6,829,426.

(51) Int. Cl.
G02B 6/44      (2006.01)
H04B 10/12     (2006.01)

(52) U.S. Cl. .................... 385/14; 385/114; 385/135

(58) Field of Classification Search ............. 385/14, 385/40, 88–94, 147
See application file for complete search history.

(56) References Cited

U.S. PATENT DOCUMENTS

| 5,463,229 | A | 10/1995 | Takase et al. |
| 6,005,991 | A | 12/1999 | Knasel |
| 6,088,493 | A | 7/2000 | Brenner |
| 6,370,293 | B1 * | 4/2002 | Emmerich et al. ............ 385/14 |
| 6,412,701 | B1 * | 7/2002 | Kohama et al. ............ 235/488 |
| 6,538,207 | B1 | 3/2003 | Barth |
| 6,560,067 | B1 * | 5/2003 | Tatehata et al. ......... 360/99.02 |
| 6,567,600 | B2 * | 5/2003 | Yoshida ..................... 385/134 |
| 6,636,685 | B2 * | 10/2003 | Hicks et al. ................ 385/147 |
| 7,088,887 | B2 * | 8/2006 | Ascanio et al. ............... 385/37 |
| 2001/0041025 | A1 | 11/2001 | Farahi |
| 2002/0024726 | A1 | 2/2002 | Hamada |
| 2002/0039467 | A1 * | 4/2002 | Amantea ..................... 385/16 |
| 2002/0071475 | A1 * | 6/2002 | Betzner et al. ............. 374/185 |
| 2003/0035204 | A1 | 2/2003 | Ahn et al. |
| 2003/0044141 | A1 | 3/2003 | Melton et al. |
| 2003/0202771 | A1 * | 10/2003 | Adams et al. .............. 385/147 |
| 2004/0215098 | A1 * | 10/2004 | Barton et al. ............... 600/549 |

FOREIGN PATENT DOCUMENTS

EP    0913268 A1 *    6/1999

OTHER PUBLICATIONS

"Flat Flexible Erbium-Doped Fiber-Coil Sheet (EDF-Sheet)", Version 1.1, Feb. 6, 2002.

(Continued)

*Primary Examiner*—Sung Pak
*Assistant Examiner*—Tina M. Wong
(74) *Attorney, Agent, or Firm*—Perkins Coie LLP

(57) ABSTRACT

A temperature-controlled flexible optical circuit includes a length of pre-fabricated optical fiber secured to a partially flexible heater circuit for heating and maintaining the optical fiber at a substantially constant temperature. Heater circuit may also comprise temperature sensors.

31 Claims, 8 Drawing Sheets

OTHER PUBLICATIONS

"Fiber Management with the Next Generation Flex Circuit" http://www.us.schott.com/optovance/english/products/opticalshuffle.html, downloaded Apr. 3, 2002.

"Fiber Optic Solutions" http://www.fciconnect.com/products/fiber_06.html, downloaded Apr. 3, 2002.

"Contours™ Optical Circuits" http://www.usconec.com/pages/product/circuit/maininfo.html, downloaded Apr. 3, 2002.

* cited by examiner

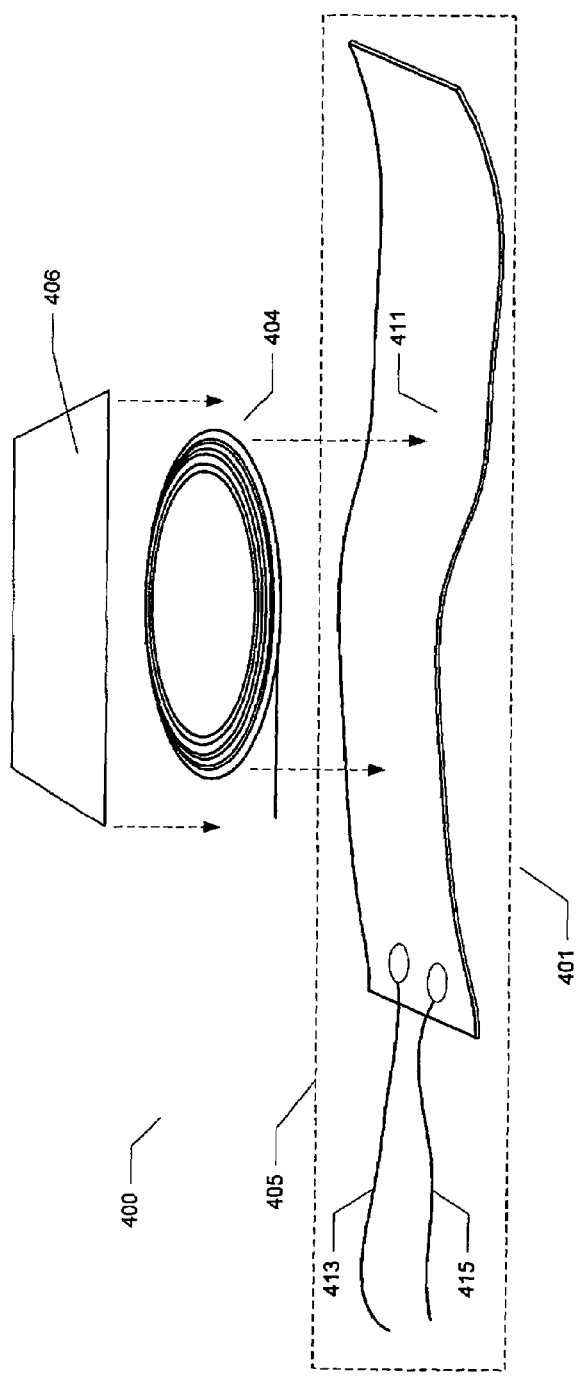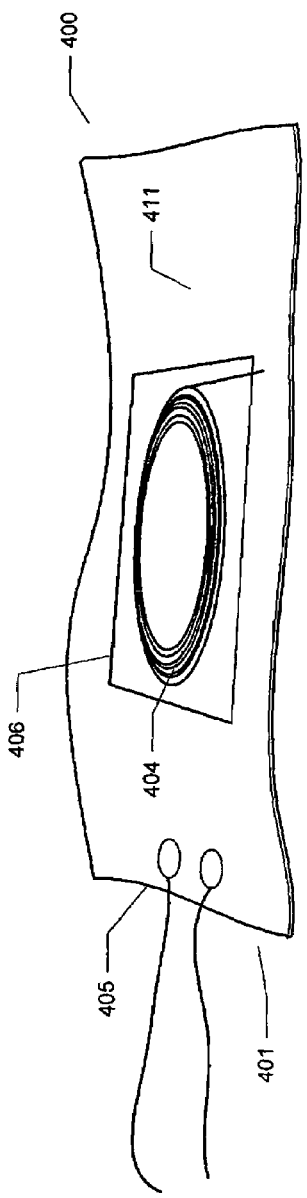
Fig. 4A
Fig. 4B

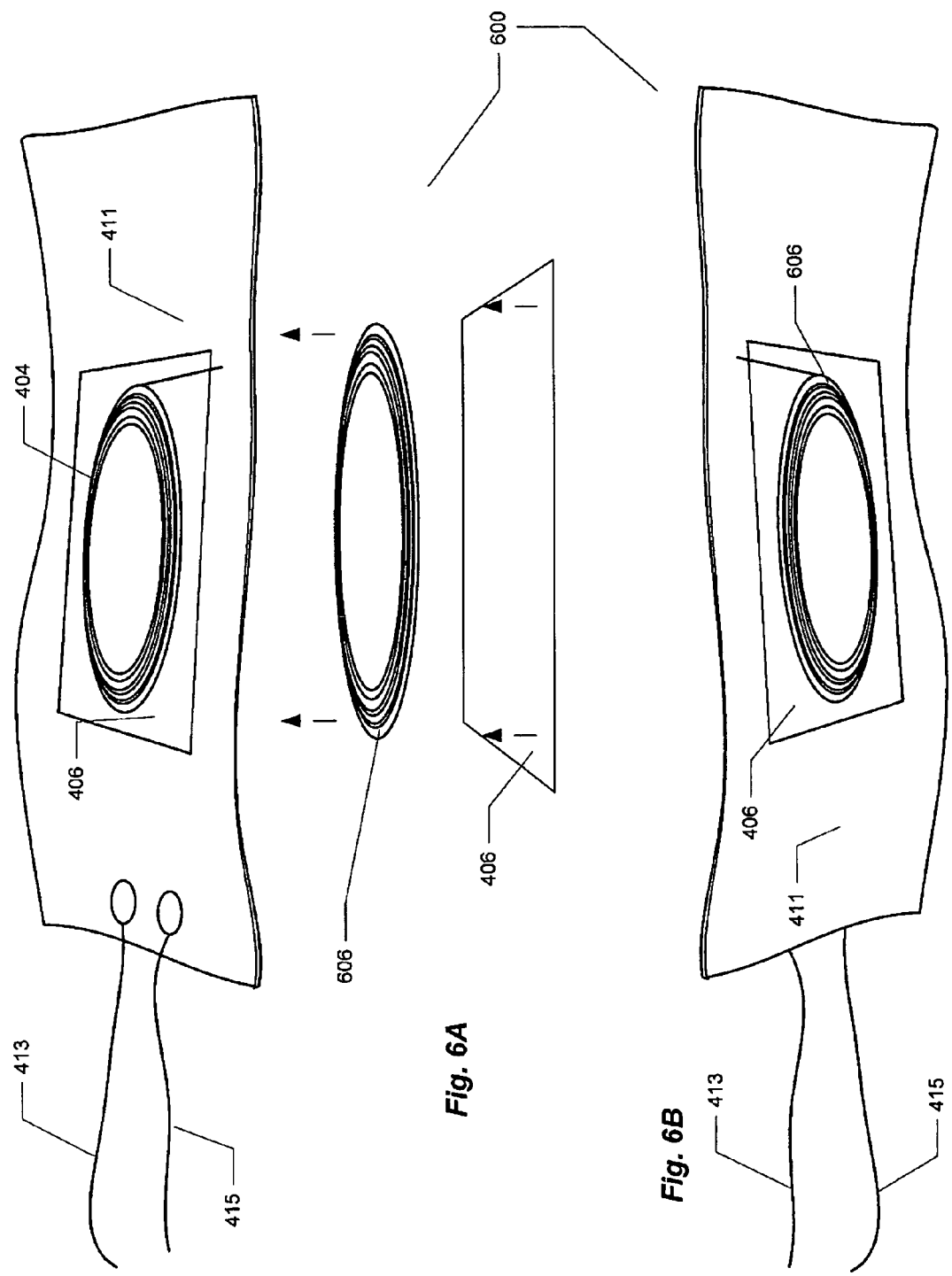

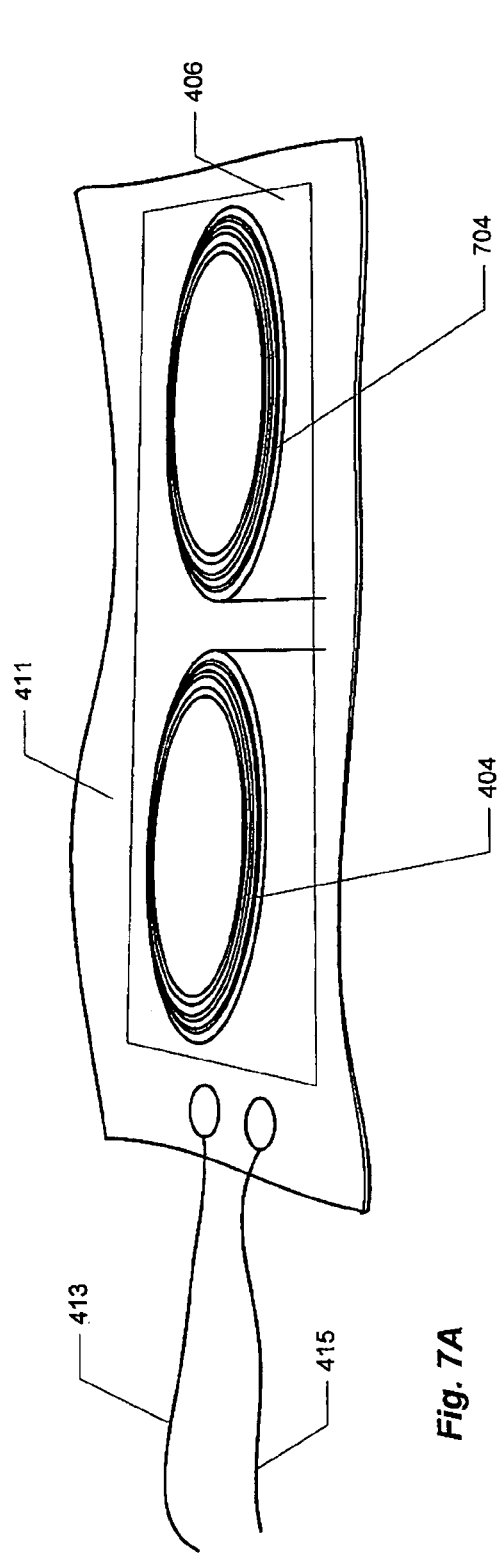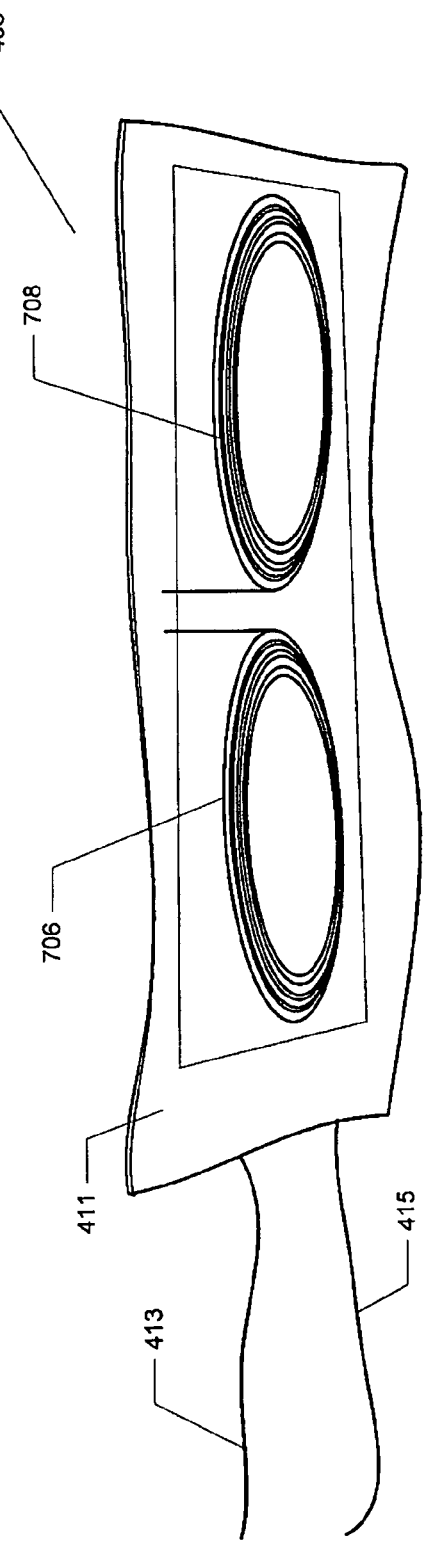

TEMPERATURE-CONTROLLED FLEXIBLE OPTICAL CIRCUIT FOR USE IN AN ERBIUM-DOPED FIBER AMPLIFIER AND METHOD FOR FABRICATING THE FLEXIBLE OPTICAL CIRCUIT

CROSS REFERENCE TO RELATED APPLICATIONS

This application is a continuation-in-part of co-owned U.S. application Ser. No. 10/127,089 filed Apr. 22, 2002, now U.S. Pat. No. 6,829,426.

BACKGROUND

1. Field

The present invention relates generally to a flexible optical circuit for use in a fiber amplifier and, in particular, to a flexible circuit that is temperature-controlled.

2. Description of Related Art

An erbium-doped fiber amplifier (EDFA) is basically an optical repeater device that functions to boost the amplitude of optical signals traveling through a fiber optic communications system. In particular, the EDFA incorporates a variety of components including a laser diode, a multiplexer and an optical fiber which is doped with the rare earth element erbium. The laser diode emits light having an infrared wavelength of 980 nm or 1480 nm that is passed through the multiplexer into the erbium-doped optical fiber. The emitted light excites the erbium atoms in the optical fiber. Then when an input optical signal having a wavelength of between 1530 nm and 1620 nm passes through the multiplexer and enters the optical fiber it stimulates the excited erbium atoms to emit photons at the same wavelength as the input optical signal. This action amplifies the input optical signal to a higher power by effectively boosting the amplitude of the input optical signal. Examples of two traditional EDFAs 100 and 200 are briefly discussed below with respect to FIGS. 1 and 2.

Referring to FIG. 1 (PRIOR ART), there is a block diagram illustrating the basic components of a traditional EDFA 100. The EDFA 100 includes a variety of components including a laser diode 102, a multiplexer 104 and a custom-designed bobbin 106 that holds a predetermined length of erbium-doped optical fiber 108. The optical fiber 108 which can be relatively long (e.g., ~50 m) is wrapped around the bobbin 106 before being placed in a package 110. The package 110 contains the various components that make-up the EDFA 100 including the laser diode 102, the multiplexer 104 and the bobbin 106. In operation, the EDFA 100 receives an input optical signal that is coupled by the multiplexer 104 along with the light from the laser diode 102 into the erbium-doped optical fiber 108 which becomes excited by the light from the laser diode 102 and outputs an amplified optical signal.

Unfortunately, there are a number of disadvantages associated with using the bobbin 106 to hold the optical fiber 108. First, the bobbin 106 needs to be custom designed so it can fit within the package 110. Secondly, the bobbin 106 itself is bulky and restricts the overall outline of the package 110. Thirdly, the optical fiber 108 may be stressed if the optical fiber 108 is wrapped too tightly around the bobbin 106. As such, the custom-designed bobbin 106 delays and adds complexity to the design of the EDFA 100 and can also adversely affect the operability of the EDFA 100.

Referring to FIG. 2 (PRIOR ART), there is a block diagram illustrating the basic components of another traditional EDFA 200. The EDFA 200 includes a variety of components including a laser diode 202, a multiplexer 204 and a predetermined length of erbium-doped optical fiber 206 that is held together by a fastener 208 including, for example, wire, string, tape, or glue (shown and described below as three wires/strings 208). Prior to being inserted into the EDFA 200, the optical fiber 206 which can be relatively long (e.g., ~50 m) is wrapped around a custom-designed fixture 210 (e.g., bobbin)(see exploded view). Once the desired length of optical fiber 206 is wrapped around the fixture 210, then the optical fiber 206 is removed from the fixture 210 and the loose coil of optical fiber 206 is contained by the wire/string 208 (see exploded view). The optical fiber 206 that is held together by the wire/string 208 is then placed in a package 212. The package 212 contains the various components that make-up the EDFA 200 including the laser diode 202, the multiplexer 204 and the optical fiber 206. In operation, the EDFA 200 receives an input optical signal that is coupled by the multiplexer 204 along with the light from the laser diode 202 into the erbium-doped optical fiber 206 which becomes excited by the light from the laser diode 202 and outputs an amplified optical signal.

Unfortunately, there are a number of disadvantages associated with using the fixture 210 to wrap the optical fiber 206 and for using the wire/string 208 to contain the optical fiber 206. First, the fixture 210 needs to be custom designed such that the coil of optical fiber 208 has the desired diameter so it can fit within the package 212. Secondly, the optical fiber 206 may be stressed if the optical fiber 206 is wrapped too tightly around the fixture 210 and also difficult to remove. Thirdly, the optical fiber 206 may be stressed if the wire/string 208 is wrapped too tightly around the optical fiber 206. As such, the custom-designed fixture 210 delays and adds complexity to the design of the EDFA 200 and the use of wire/string 208 to hold the loose coil of optical fiber 206 can adversely affect the operability of the EDFA 200. A new flexible optical circuit for use in EDFAs was first described in co-owned and co-pending U.S. patent application Ser. No. 10/127,089, filed Feb. 26, 2001, and entitled Flexible Optical Circuit For Use In An Erbium-Doped Fiber Amplifier And Method For Fabricating The Flexible Optical Circuit, which is incorporated by reference herein.

It is known in the art that the gain of an optical amplifier is dependent upon the temperature of the optical fiber. As the temperature of the fiber fluctuates, so does the gain and noise figure. However, it is desired for amplifier gain and noise figure to be consistent and therefore predictable during operation. Thus, maintaining the temperature of the fiber at a constant level irrespective of ambient temperature is desirable.

Techniques for compensating for temperature variations in EDFAs have been used with varied results. One could alter the power of the "pump" laser source in response to temperature to modify the population inversion. This provides a flat gain curve over temperature and has the advantage of requiring no external components. However, this results in a change in total output power which is unacceptable in most designs. The input signal power could also be altered with respect to temperature to modify the population inversion by coupling to the EDFA a variable optical attenuator. The disadvantage of this technique is that total gain of the EDFA would have to be increased in order to compensate for loss resulting from the attenuator.

A variable gain equalizer, either temperature-dependent or manually controlled, may be used to vary gain as necessary. These devices are expensive, increasing the cost of the system, and their use also results in signal loss. Also, gain-flattening filters ("GFF"s) have been used to attempt to compensate for temperature-induced variation in gain, however, such filters are themselves temperature dependent making them inappropriate for temperature compensation of the overall gain.

A final technique of overcoming variation in gain due to temperature is heating the optical fiber inside the EDFA. However, current methods of maintaining constant temperature of an optical fiber used in erbium-doped fiber amplifiers are bulky, and increase thermal resistance and assembly time. For example, FIG. 3A (PRIOR ART) shows an optical circuit 300 employing a specially designed bobbin 301 to hold the optical fiber 304 in place similar to that used in the EDFA shown in FIG. 1. To manage temperature of the optical fiber 304, a heating element 307 is mechanically attached to the bobbin 301. FIG. 3B (PRIOR ART) shows the optical circuit 300 with specially designed bobbin 301. To manage temperature of the optical fiber 304, a heating coil 308 is wrapped around bobbin 301. In addition, to the lengthy time to produce such a temperature-controlled optical fiber for use in an EDFA, each time a new amplifier is designed, along with a new bobbin or spool, a new heating element or coil must also be developed increasing design time. Moreover, the heating element would increase system power consumption.

Thus, a new flexible optical circuit that allows for temperature control of the erbium-doped optical fiber is needed that is less bulky and reduces assembly time, making production more efficient.

SUMMARY

The present disclosure is directed to a temperature-controlled flexible optical circuit for use in an erbium-doped fiber amplifier and a method for fabricating the flexible optical circuit. The flexible optical circuit in one embodiment includes a length of prefabricated optical fiber that is placed onto and secured to a partially flexible heater circuit. In another embodiment, the heater circuit also comprises temperature sensors, for example, thermistors, resistance temperature detectors or thermocouples to allow monitoring and control of the temperature of the flexible circuit. Several different embodiments are disclosed herein below.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 4A is an exploded view of a temperature-controlled flexible circuit according to the present invention.

FIG. 4B is a perspective view of a temperature-controlled flexible circuit according to the present invention.

FIGS. 6A & 6B illustrates a temperature-controlled flexible circuit comprising two optical fibers.

FIGS. 7A & 7B illustrates a temperature-controlled flexible circuit comprising a plurality of optical fibers.

DETAILED DESCRIPTION

Figure 1:
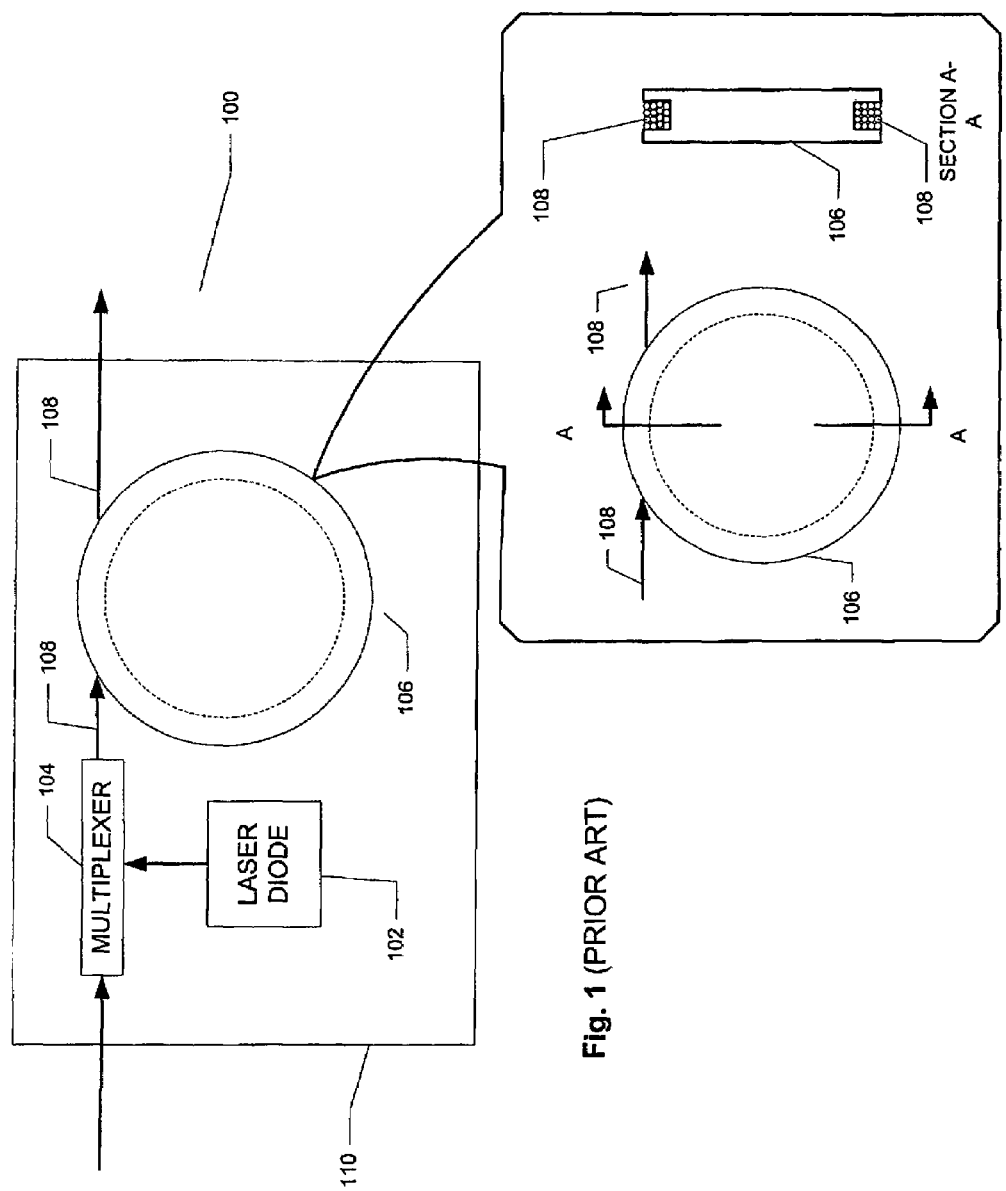
FIG. 1 depicts an example of a prior art erbium-doped fiber amplifier
Figure 2:
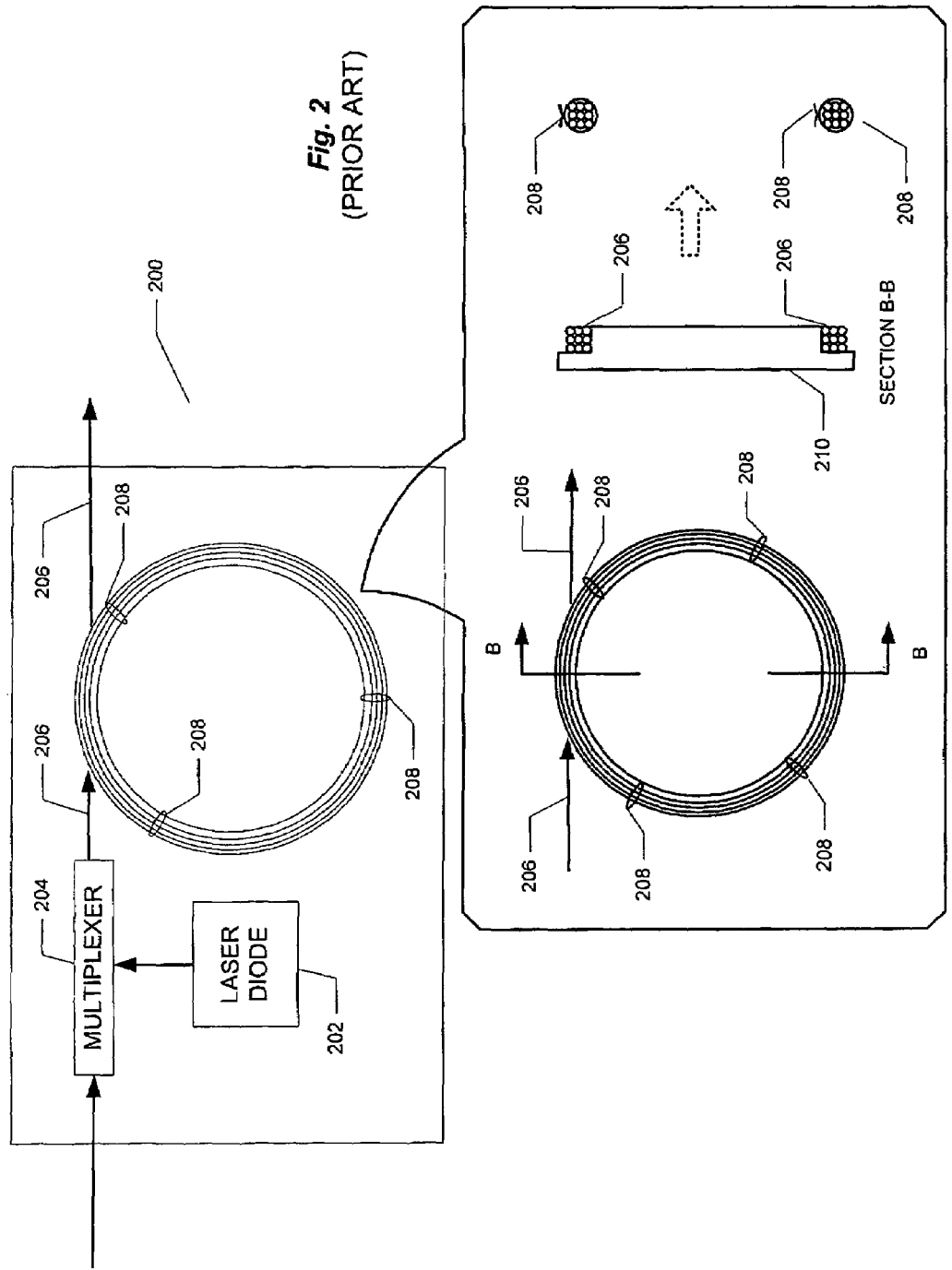
FIG. 2 depicts another example of a prior art erbium-doped fiber amplifier.

The various embodiments of the present invention and their advantages are best understood by referring to FIGS. 4 through 8 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Referring to FIG. 4, a temperature-controlled flexible optical circuit 400 according to the present invention comprises flexible heater circuit 405. Heater circuit 405 comprises a heating element 411 which is a thin, flexible copper trace, preferably etched in a pattern such that uniform heating of the copper is achieved when a voltage is applied to the heating element 411 through leads 413, 415. Heater circuit 405 may be encased or laminated with a polyimide layer on either side. Examples of such heater circuits include the Thermofoil™ Flexible Heaters offered by Minco Products, Inc.

A length of optical fiber 404 is secured to heater circuit 405. The optical fiber 404 is an optical fiber 404 doped with a rare earth element such as erbium (e.g., erbium-doped optical fiber 404). The length of optical fiber 404 needed in the circuit can vary. It is anticipated that one of the uses of the present invention is in erbium-doped fiber amplifiers. The length of optical fiber 404 in such applications may vary between about 3 m and about 50 m and is a choice of design dependent upon the gain required in a given amplifier application. Optical fiber 404 may be secured to heater circuit 405 in a variety of ways including, for example, using one or more adhesive sheets 406 (shown is one transparent adhesive sheet 406). A liquid adhesive may be used as well. Another Optical fiber 404 can be automatically placed onto heater circuit 405 in a way that substantially reduces if not eliminates the stress on optical fiber 404.

When energized, heater circuit 405 heats substantially uniformly to bring optical fiber to the desired temperature. In operation, ambient temperature may be between −5° C. and 70° C. Further, because there is no cooling mechanism, a flexible optical circuit according to the present invention would preferably operate at a constant 70° C. It will be appreciated by those skilled in the relevant arts with the benefit of this disclosure that one the advantage of the present invention is that optical fiber 404 may be maintained at a constant temperature resulting in greater consistency of gain in an amplifier application, yet with a less bulky, more flexible component, which requires less material to manufacture than the devices currently in the prior art.

Figure 5:
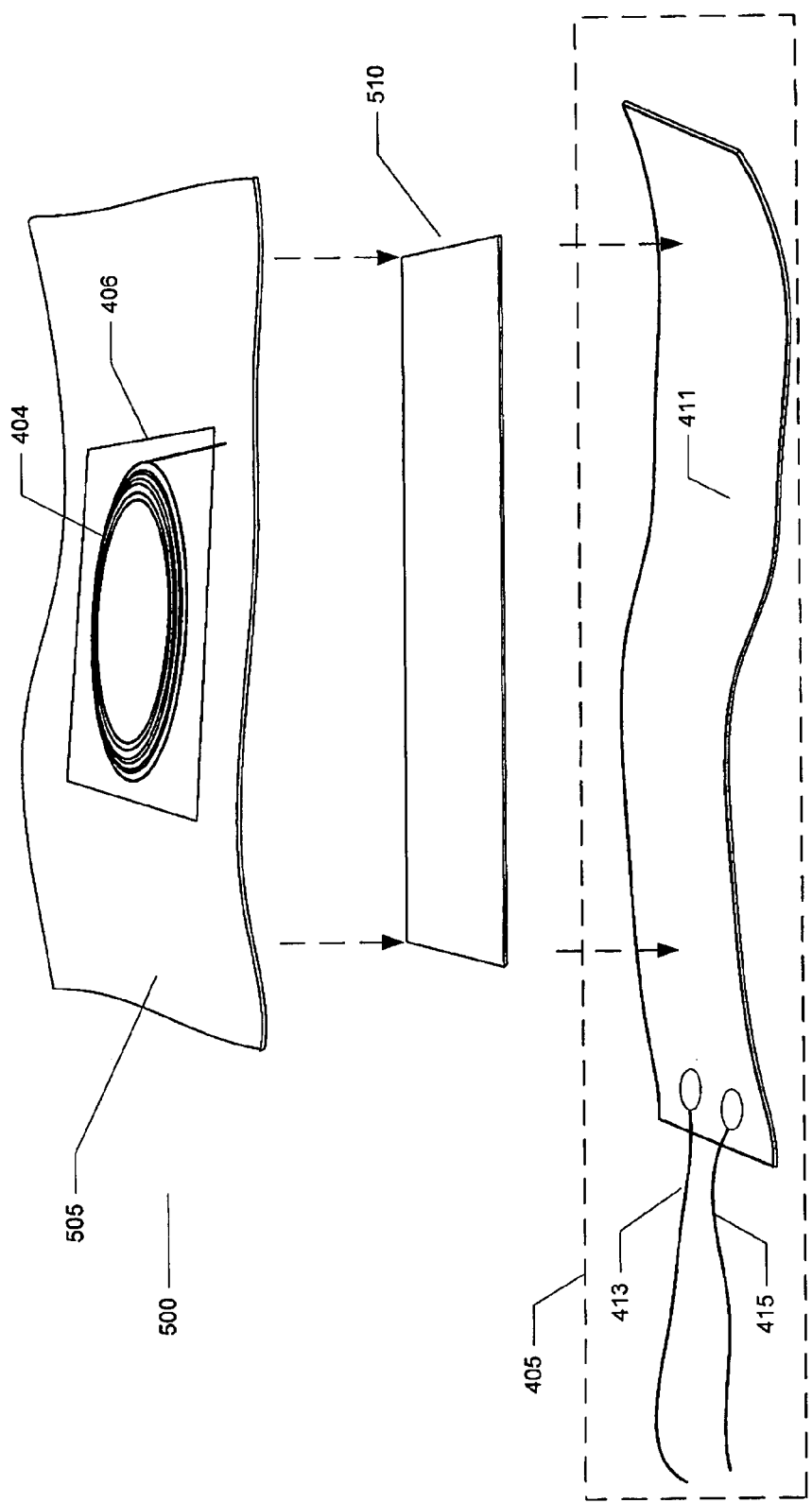
FIG. 5 is an exploded view of a second embodiment of a temperature-controlled flexible circuit according to the present invention.

Another configuration of the present invention is described with reference to FIG. 5. A temperature-controlled flexible optical circuit 500 is comprised of a flexible optical circuit 501 including a pre-fabricated optical fiber 406 secured to flexible sheet 505, which can be, for example, a laminate material such as a polyimide sheet, as disclosed in U.S. patent application Ser. No. 10/127,089. An adhesive sheet 406 may be used to secure optical fiber 404 to flexible sheet 505. A liquid adhesive may be used as well. Heater circuit 405 comprises a heating element 411 which may be a thin, flexible copper trace, etched in a pattern such that uniform heating of the copper is achieved when a voltage is applied to the heating element 411 through leads 413, 415. Heater circuit 405 may be encased or laminated with a polyimide layer (not shown) on either side. Flexible optical circuit 500 is secured to heater circuit 405 by use of thermally conductive double-sided adhesive tape 510. This embodiment achieves the benefits of heating optical fiber 404 to improve gain consistency; however, in comparison to the embodiment described with reference to FIG. 4, it should be acknowledged that a manufacturing process for such a configuration would require the additional step of combining the flexible circuit and the heater circuit. Also, it would require added materials in the polyimide sheet and the thermally conductive adhesive tape.

FIG. 6A depicts yet another embodiment of the present invention. Temperature-controlled flexible optical circuit 600 comprises heater circuit 405 which comprises a heating element 411 which may be a thin, flexible copper trace, etched in a pattern such that uniform heating of the copper is achieved when a voltage is applied to the heating element 411 through leads 413, 415. Heater circuit 405 may be encased or laminated with a polyimide layer (not shown) on either side. A first optical fiber 404 is secured to one surface of heater circuit 405. A second optical fiber 606 is secured to the opposing surface of heater circuit 405. Heater circuit 405 in this embodiment should be constructed such that it manifests equal thermal fields on either surface. FIG. 6B depicts the opposing side of heater circuit 405 showing second optical fiber 606 secured thereto with a second adhesive sheet.

FIGS. 7A&B illustrates another embodiment wherein temperature-controlled flexible optical circuit comprises heater circuit 405 with heating element 411 and leads 413, 415. Secured to a first surface of heating element 411 are first optical fiber 404 and second optical fiber 704. First and second optical fiber may be secured with an adhesive sheet 406, shown as a transparent adhesive sheet 406. A liquid adhesive may be used as well. FIG. 7B depicts the opposing surface of heating element 411 whereon are secured third and fourth optical fibers 706 & 708. Third and fourth optical fibers may be secured to the opposing surface of heating element 411, again using a transparent adhesive sheet 406.

Figure 8:
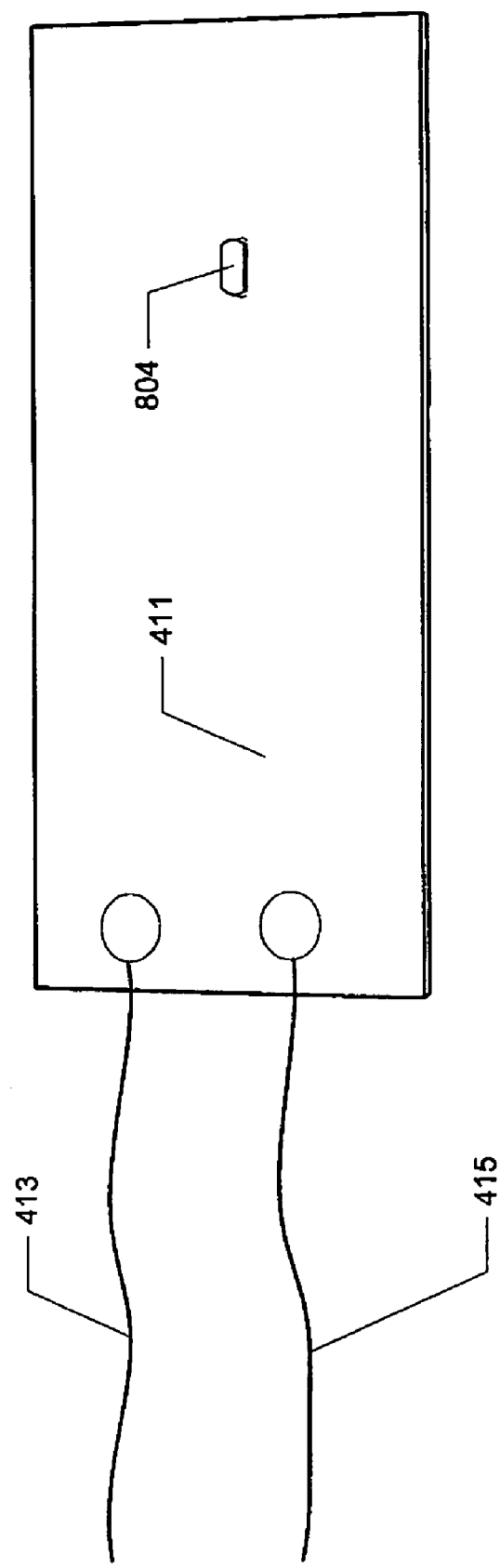
FIG. 8 depicts a temperature-controlled flexible circuit with an embedded temperature sensor.

Referring now to FIG. 8, temperature control of the heater circuit 405 may be achieved by including one or more temperature sensors 812, for example, thermistors, resistance temperature detectors (RTDs) or thermocouples, embedded within heating element 411. Temperature detector 812 are coupled to a logic circuit (not shown) to complete a feedback loop to allow monitoring and control of heater circuit temperature. Examples of such heater circuits integrated with temperature sensors include the Thermofoil™ heater circuit available from Minco Products, Inc.

The number of temperature sensors may vary. If heater circuit 405 is capable of substantially uniform heating over the surface of heating element 411, then one temperature sensor may suffice. However, if heating element is not uniform in its heat distribution, more temperature sensors may be required. It will be appreciated by those skilled in the art that the addition of more temperature sensors will increase the circuitry required to complete a feedback loop and thus, size and cost may increase as well.

The choice of size and type of temperature sensor will depend, in part, upon design considerations. It is preferable to utilize a sensor with a quick temperature response. However, this performance may have to be given up for cost of the circuit. Such design considerations would be well-understood by those skilled in the relevant arts.

Figures 3A, 3B:
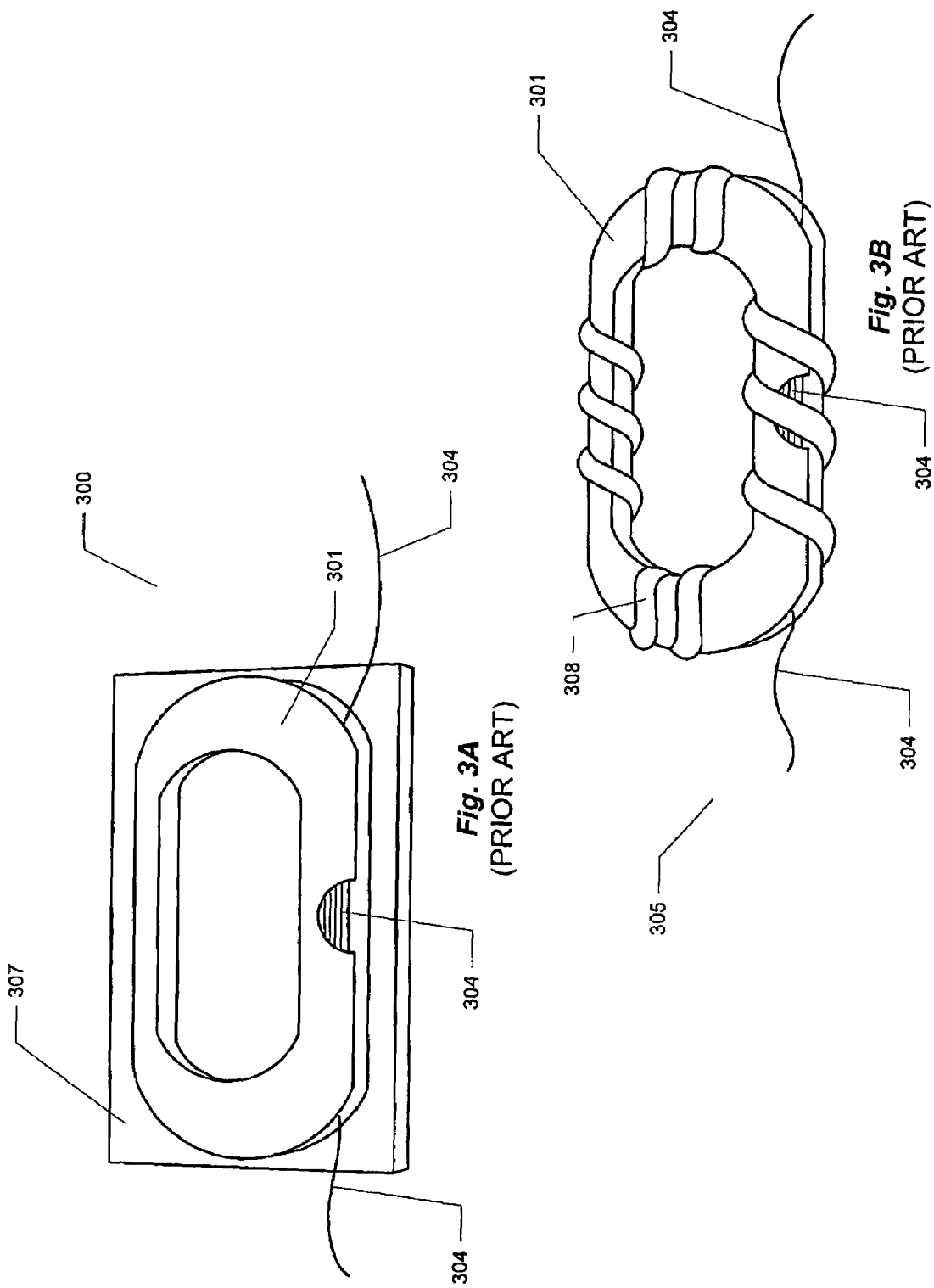
FIGS. 3A & 3B depict examples of a prior art temperature-controlled optical circuit

From the foregoing, it can be readily appreciated by those skilled in the art that the flexible optical circuits will provide consistent gain irrespective of ambient temperature, but are less expensive and can be assembled with lower overhead costs by a machine in less time than was needed to organize and secure the optical fiber in the traditional temperature-controlled EDFA 100 and 200 (see FIGS. 3A and 3B).

As described above and shown in the associated drawings, the present invention comprises an apparatus for a temperature-controlled flexible optical circuit for use in an erbium-doped fiber amplifier. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A flexible optical circuit comprising:
   a. a partially flexible substrate, said partially flexible substrate further comprising a heating element for maintaining said flexible circuit at a constant temperature; and
   b. a length of pre-fabricated optical fiber secured to said substrate.

2. The flexible optical circuit of claim 1, wherein the partially flexible substrate further comprises temperature sensors.

3. The flexible optical circuit of claim 2, wherein said temperature sensor is a thermistor.

4. The flexible optical circuit of claim 2, wherein said temperature sensor is a thermocouple.

5. The flexible optical circuit of claim 2, wherein said temperature sensor is a resistance temperature detector.

6. A flexible optical circuit resistant to variations in ambient temperature for use in an optical fiber amplifier comprising:
   a. a partially flexible substrate, said partially flexible substrate having a first surface and a second surface and comprising a flexible heating element; and
   b. a first pre-fabricated optical fiber secured to said first surface.

7. The flexible optical circuit of claim 6, further comprising a second pre-fabricated optical fiber secured to said first surface.

8. The flexible optical circuit of claim 7, further comprising a third pre-fabricated optical fiber secured to said second surface.

9. The flexible optical circuit of claim 6, further comprising a second pre-fabricated optical fiber secured to said second surface.

10. The flexible optical circuit of claim 6, further comprising a temperature sensor embedded within said flexible heating element.

11. The flexible optical circuit of claim 10, further comprising a second pre-fabricated optical fiber secured to said first surface.

12. The flexible optical circuit of claim 11, further comprising a third pre-fabricated optical fiber secured to said second surface.

13. The flexible optical circuit of claim 10, further comprising a second pre-fabricated optical fiber secured to said second surface.

14. An optical fiber amplifier, said optical fiber amplifier comprising flexible optical circuit, said flexible optical circuit comprising:
   a. a flexible heater circuit, said flexible heater circuit comprising a flexible heater element and having a first surface;
   b. a first length of pre-fabricated optical fiber secured to said first surface of said flexible heater circuit.

15. The optical fiber amplifier of claim 14 wherein said flexible optical circuit further comprises a second length of pre-fabricated optical fiber secured to said first surface of said flexible heater circuit.

16. The optical fiber amplifier of claim 14 wherein said flexible optical circuit further comprises a second length of pre-fabricated optical fiber secured to a second surface of said flexible heater circuit.

17. The optical fiber amplifier of claim 14 wherein said flexible heater circuit further comprises temperature sensors.

18. The optical fiber amplifier of claim 17 wherein said flexible optical circuit further comprises a second length of pre-fabricated optical fiber secured to said first surface of said flexible heater circuit.

19. The optical fiber amplifier of claim 18 wherein said flexible optical circuit further comprises a third length of pre-fabricated optical fiber secured to a second surface of said flexible heater circuit.

20. The optical fiber amplifier of claim 17 wherein said flexible optical circuit further comprises a second length of pre-fabricated optical fiber secured to a second surface of said flexible heater circuit.

21. A method for fabricating a temperature-controlled flexible optical circuit comprising the steps of:
   a. providing a partially flexible substrate, said partially flexible substrate including a flexible heater circuit;
   b. obtaining a length of pre-fabricated optical fiber; and
   c. securing said length of pre-fabricated optical fiber to said partially flexible substrate.

22. The method of claim 21, wherein said flexible heater circuit further comprises a temperature sensor.

23. The method of claim 22, wherein said temperature sensor is a resistance temperature detector.

24. The method of claim 22, wherein said temperature sensor is a thermocouple.

25. The method of claim 22, wherein said temperature sensor is a thermistor.

26. The method of claim 21, further comprising the steps of;
   a. obtaining a second length of pre-fabricated optical fiber; and
   b. securing said second length of pre-fabricated optical fiber to said partially flexible substrate.

27. The method of claim 26, wherein said partially flexible substrate has a first surface and a second surface, and wherein said second length of pre-fabricated optical fiber is secured to said second surface.

28. The method of claim 27, wherein said flexible heater comprises a temperature sensor.

29. The method of claim 28, wherein said temperature sensor is a resistance temperature detector.

30. The method of claim 28, wherein said temperature sensor is a thermocouple.

31. The method of claim 28, wherein said temperature sensor is thermistor.

* * * * *